United States Patent [19]

Howe

[11] 4,236,183
[45] Nov. 25, 1980

[54] OPTICAL CONFIGURATIONS FOR A ROTATING POLYGON FILM SCANNER

[75] Inventor: Dennis G. Howe, Rochester, N.Y.

[73] Assignee: Eastman Kodak Company, Rochester, N.Y.

[21] Appl. No.: 68,031

[22] Filed: Aug. 20, 1979

[51] Int. Cl.³ .............................................. H04N 3/36
[52] U.S. Cl. .................................................. 358/214
[58] Field of Search ................................ 358/214–216, 358/212, 213, 54, 206, 292, 293, 130–132, 6, 7; 350/285; 250/236

[56] References Cited

U.S. PATENT DOCUMENTS 4,148,071 4/1979 Zinchuk ............................. 358/214

OTHER PUBLICATIONS

Wright et al., "Solid State Sensors: The Use of a Single Dimension 512 Element Array for Film Scanning," BBC Research Dept. Report No. 1973/32.
Bergmann et al., "Focus Path of a Laser Beam Deflected by a Prismatic Polygon Mirror: Its Calculation and Optimization", *Applied Optics*, vol. 15, No. 12, Dec. 1976, pp. 3084–3088.

*Primary Examiner*—John C. Martin
*Attorney, Agent, or Firm*—Thomas H. Close

[57] ABSTRACT

Optical configurations for a rotating polygon film scanner for scanning film such as motion picture film or slide transparencies to produce a television signal are disclosed. The film scanner includes a solid-state line sensing array for scanning the image of a film frame in a direction generally perpendicular to the length of the film, and a rotating multifacet mirror such as a reflecting polygon for displacing the image relative to the line sensing array in a direction generally parallel with the length of the film. The optical configurations include the polygon mirror, a film gate, and a scan lens for forming an image of the film in the gate on the solid-state line sensing array. The scan lens is located between the line sensing array and the polygon mirror to provide on-axis scanning in the direction parallel with the length of the film. The film gate is configured to constrain the film to a surface such that the portion of the image impinging on the line sensing array is always in focus as the image is displaced by the polygon mirror. The shape of this surface is controlled by the relationship between the distance from the center of the film gate to the polygon mirror and the radius of a circle inscribed within the polygon mirror. In one configuration, the surface is a portion of a cylinder; in another, the surface is substantially flat. To reduce distortion of the image scanned across the line sensor, the optical axis of the scan lens, the axis of rotation of the polygon and the center of the film gate lie in a common plane.

6 Claims, 9 Drawing Figures

OPTICAL CONFIGURATIONS FOR A ROTATING POLYGON FILM SCANNER

BACKGROUND OF THE INVENTION

1. Field of the Invention

This invention relates to film scanners and more particularly to the optical configuration of a film scanner employing a line sensing array for scanning in one direction and a rotating multifacet mirror such as a reflecting polygon for displacing the line scan in a direction perpendicular to the line scan direction to effect a raster scan of the film.

2. Discussion Related to the Problem

Apparatus for scanning motion picture film to produce a television signal is well known. In such film scanning apparatus, a film frame is scanned in a direction generally perpendicular to the length of the film at a standard television line rate. The line scan is displaced in a direction generally parallel with the length of the film at a standard television field rate. In the prior art, the line scan has been accomplished by flying spot scanners employing Nipkow discs, movable reflecting elements or cathode ray tubes. The use of a solid-state line sensing array as an alternative to a flying spot scanner to provide the line scanning function in a film scanner has been proposed. See D. T. Wright, "Solid-State Sensors; The Use of a Single Dimension 512-Element Array for Film Scanning," BBC Research Department Report No. 1973/32. The potential advantages of a line sensing array over a flying spot scanner are numerous, including: reduced size, weight, maintenance and cost.

These advantages make the solid-state line sensing array particularly attractive for use in a film scanner for displaying amateur movie film on a home television set. A technique for converting an 18 frame per second motion picture film to a 60 field per second television signal is disclosed in copending U.S. patent application No. 68,032 entitled FILM SCANNING METHOD AND APPARATUS EMPLOYING OPTICAL SPLICE TECHNIQUE FOR FRAME-RATE CONVERSION, by D. G. Howe filed on the same day as this application. The scanning apparatus disclosed by Howe includes a solid-state line sensing array for scanning a given line of a projected image of the film, in a direction generally perpendicular to the length of the film, and a rotating multifacet mirror comprising a reflecting polygon for displacing the image relative to the line sensing array, in a direction generally parallel to the length of the film to effect a raster scan of the film frames. The design of the optical configuration of the rotating polygon scanner presented the following problems.

If the scanning objective lens is positioned in the optical path between the film and the rotating polygon so that the optical axis of the lens is deflected by the polygon facets to sweep across the line sensor, most of the time, the image falling on the line sensor is an "off-axis" image. This requires a very high quality lens to achieve acceptable resolution. Furthermore, if the portion of the image impinging upon the line sensing array is to remain in focus, an anamorphic (cylindrical field) lens must be employed. As is well known, a high quality, anamorphic lens of this type would be very expensive to manufacture. The cost of such a lens would constitute a major portion of the total cost of the scanner.

On the other hand, if the scanning objective lens is positioned in the optical path between the rotating polygon and the line sensing array so that the optical axis of the lens is deflected by the polygon to sweep the film gate, the image falling on the line sensor is always on-axis in the direction of the length of the film and a relatively simple, and consequently less expensive, lens may be used. Unfortunately, this scanning arrangement introduces other problems. In general, with the few exceptions noted below, the film surface, required to keep the portion of the image impinging on the line sensing array in focus as the image is displaced by the polygon, will not be a flat plane, or any other simply realizable configuration for a film plane. In fact, the shape of the surface, as viewed through a cross-section taken parallel with the length of the film, will generally resemble a recurved bow. Other types of optical distortion and vignetting are encountered as a function of the changing angle that the optical axis makes with a facet of the polygon as the polygon rotates. The angularly dependent distortion and vignetting generally increase as the angle between the optical axis and a polygon facet varies from 90°.

The problem therefore is to provide an optical scanning system for a rotating polygon film scanner that employs inexpensive optics (like the latter mentioned scanning arrangement) while providing an easily defined film surface and that also minimizes the angularly dependent optical distortion and vignetting caused by the rotating polygon scanner.

It also is desirable that such a system work with a relatively fast (i.e. low f/no.) scan lens. A relatively fast scan lens allows the line sensor to be irradiated with enough light so that the sensor will produce signals having a good signal-to-noise ratio when the sensor is operated at rates corresponding with TV line scan rates.

SOLUTION—SUMMARY OF THE INVENTION

The above-noted problems are resolved according to the present invention by employing a special optical arrangement that results in an easily realizable film plane configuration. The scanning apparatus includes a light source and a scan lens for projecting an image of a portion of the film defined by a film gate. A solid-state line sensing array is arranged to scan line portions of the image of the film in a direction generally perpendicular to the length of the film at a standard television line rate to produce a television signal. The image of film is swept past the line sensing array in a direction generally parallel with the length of the film (i.e. perpendicular to the long dimension of the line sensing array) by a rotating polygon having a number of reflecting facets disposed at a distance R from the axis of rotation.

The polygon is disposed in the optical path between the scan lens and the film such that the optical axis of the scan lens between the polygon and the film is deflected by the polygon to sweep the film gate and such that the optical axis between the line sensing array and the polygon lines in a common plane with the axis of rotation of the polygon and the center of the film gate. In a preferred embodiment of the invention, the optical axis between the scan lens and the polygon is perpendicular to the axis of rotation of the polygon, and the scanner further includes a beam splitter disposed in the optical path between the film and the line sensing array thereby allowing the sensing array to be located to one side of the optical path between the film and the polygon so that the sensing array does not interfere with the light coming from the film to the polygon.

The film gate constrains the film to coincide with a surface defined such that the portion of the image impinging upon the line sensing array is always in focus as that image is deflected by the polygon. The shape of this surface is controlled by the relationship between the distance from the center of the film gate to the polygon mirror and the radius, R, of a circle inscribed within the polygon. According to one optical configuration, the distance D along the optical axis between a polygon facet and the center of the film gate is equal to R. With this arrangement, the film surface defined by the film gate is a cylindrical surface of radius 2R centered about the polygon axis of rotation, and the film gate is easily configured accordingly. According to another configuration, the radio R/D is equal to $$\frac{1 + \cos \phi_M}{\cos \phi_M}$$

where $\phi_M$ is the maximum angle that the deflected optical axis between the film gate and the polygon makes with the plane defined by the center of the film gate and the axis of rotation of the polygon. With this arrangement the film surface defined by the film gate is a substantially flat plane; the film gate is easily configured accordingly. Since the portion of the image falling on the line sensor always remains in focus on the sensor, all distortions that would normally result from changes in the object image conjugate distances during scanning is eliminated.

Another feature of the invention is that uniform irradiance of the sensor is maintained throughout the scan range $\pm \phi_n$, i.e. there is negligible angularly dependent vignetting. In the preferred embodiment, this is achieved by the facts that the clear aperture of the scan lens is large enough to allow the limiting aperture of the optical system to be defined by the polygon facets and that the film gate which acts as the scanning field stop is just one film frame (i.e. one vertical scan distance) high. These features in combination with the features noted above eliminate vignetting and scan angle dependent irradiance variations in the line images falling on the sensor.

DESCRIPTION OF THE DRAWINGS

The invention will be described with reference to the drawings, wherein.

DESCRIPTION OF THE PREFERRED EMBODIMENTS

Certain features disclosed but not claimed in this application are the subject of copending U.S. patent application Ser. No. 68,032 entitled FILM SCANNING METHOD AND APPARATUS EMPLOYING OPTICAL SPLICE TECHNIQUE FOR FRAME-RATE CONVERSION by D. G. Howe, filed on the same day as the present application.

DESCRIPTION OF THE FILM SCANNING APPARATUS

Figure 1:
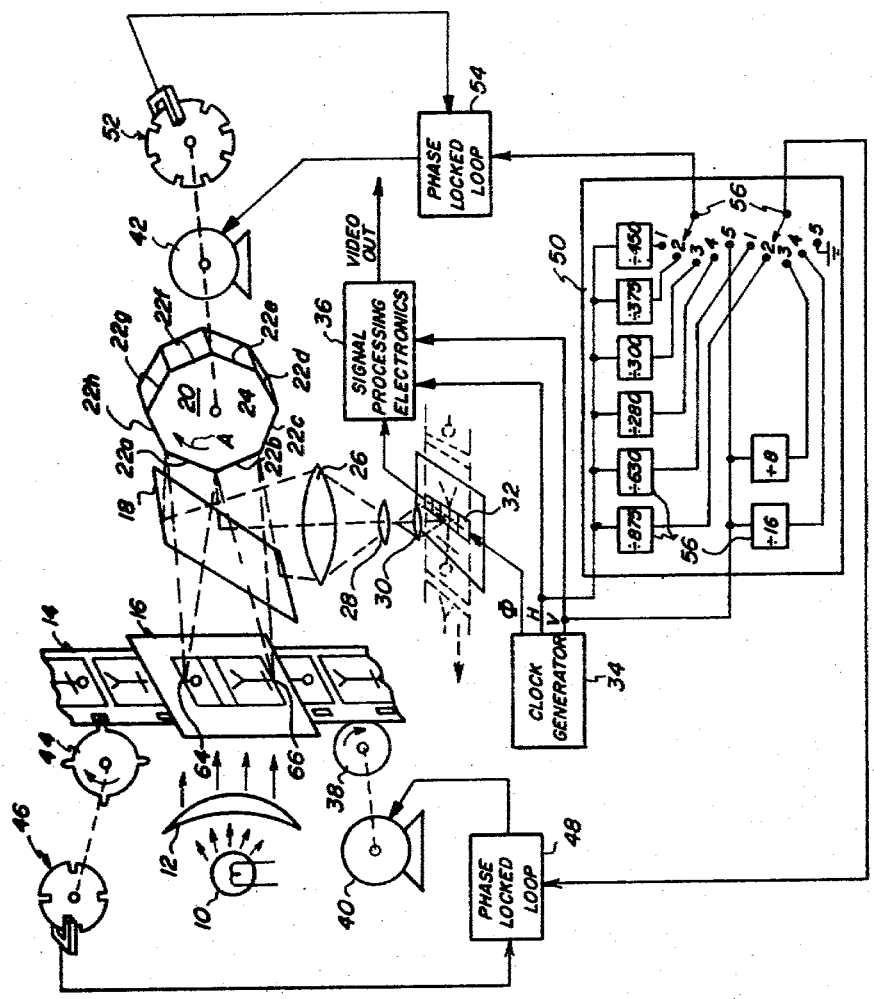
FIG. 1 is a schematic diagram of film scanning apparatus having an optical configuration according to the present invention.

A film scanner having an optical configuration according to the present invention is shown schematically in FIG. 1. The scanner includes a light source 10 and a condensing lens 12 for illuminating a portion of motion picture film 14 in a film gate 16. Light from the film gate passes through a beam splitter 18 and is reflected from an optical polygon 20. The optical polygon has a plurality of facets 22a, b, c . . . that are arranged about an axis of rotation 24. Light reflected from the polygon facets is again reflected by the beam splitter and an image of the film gate is formed by scanning lens 26. The image is relayed by a field lens 28 and an objective lens 30 to a solid-state line sensing array such as a charge coupled device (CCD) image sensor 32. It is noted that field lens 28 and objective lens 30 are not required if the line sensing array is as wide as the image of the film gate formed by the scan lens. A TV signal is generated, line by line, by clocking the CCD line sensor 32 in the standard manner. The polyphase clock signals ($\Phi$) for controlling the CCD line sensor and horizontal (H) and vertical (V) sychronization signals for constructing a standard composite TV signal are generated by a clock generator 34. The output of the line sensor 32, and the horizontal and vertical sync signals are supplied as inputs to signal processing electronics 36, which produces the standard composite TV signal from the inputs in a known manner.

In operation, motion picture film may be moved continuously through gate 16 by a capstan 38 which is driven by a motor 40. Also, polygon 20 may be rotated about axis 24 by a motor 42. If the scanner is employed to scan single frame transparencies, such as slides, the film drive motor would not be required. From FIG. 1, it can be appreciated that as polygon 20 rotates, each facet, in its turn, will cause an image of the film in the film gate to sweep across the line sensing array 32 in a direction generally parallel with the length of the film. Looking backward through the optical system it can be imagined that, as the polygon rotates, each facet causes a projected image of the line sensing array to sweep across the film gate, thereby sensing, line by line, the film in the gate.

Figure 2:
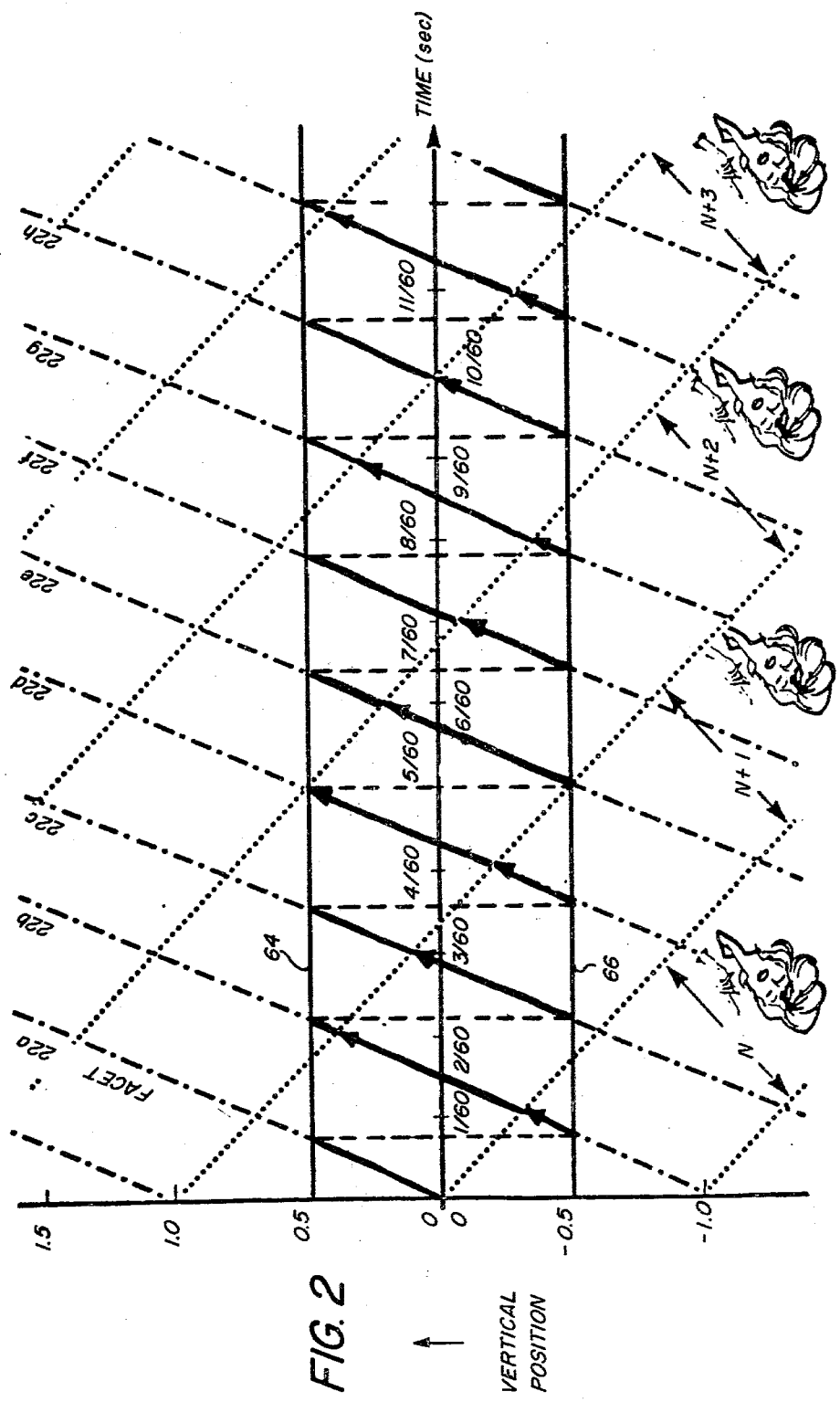
FIG. 2 is a timing chart useful for explaining the operation of the scanning apparatus.

FIG. 2 is a timing diagram showing how frame-rate conversion is achieved by the scanning apparatus when employed to scan motion picture film. The horizontal axis of the diagram represents time and is divided into convenient units of 1/60 of a second. The vertical axis represents vertical position in the film gate and is divided into units of film frames. Since both the film frames and the imagined projected image of the line sensing array may move with respect to the film gate, the motion of both are conveniently depicted in this reference system. The top and bottom of the aperture formed by film gate 16 are represented as horizontal lines 64 and 66, respectively.

Assuming that polygon 20 is rotated by motor 42 at 42 facets per second in the direction indicated by arrow A in FIG. 1, the path of a line scan, as deflected by a facet of the rotating polygon, will traverse the film gate from bottom to top in 1/42 of a second. The chain lines slanting up from left to right in FIG. 2 depict the line scan paths. Each line scan path is labelled to correspond to the polygon facet that generated the path. The portions of the paths lying between the top and bottom of the film gate are drawn with heavy arrows, indicating that the corresponding facet is "optically active" during this time. "Optically active" as used herein means that a portion of the image of the film gate reflected by one particular facet falls upon the line sensor. The portion of the image falling on the sensor that corresponds to other "non-active" facets is blocked by the opaque film gate which acts as a scan field stop. In other words, the range of scan angle over which any one given facet is "optically active" is defined by the vertical film gate height—and only one facet is active at any instant of time.

The film is continuously moved through the film gate in a direction opposite to the displacement of the imagined projected image of the line sensor. Accordingly, dotted lines representing the interframe bars between individual film frames slant down from left to right in FIG. 2. Assuming the film to be moved through the gate at 18 frames per second, an interframe bar intercepts the time axis every 1/18 of a second. A sketch of a girl subject for each frame is shown at the bottom of the diagram for convenience in keeping track of the top and bottom of the frames. The frames have been numbered consecutively as frame N through N+3 in the normal order of their passage through the film gate.

Starting from the origin and beginning at the top of frame N+1, the scan by facet 22a proceeds from the top of frame N+1 down through the frame until the top edge of the film gate is encountered. The scan of frame N+1 is terminated by the top edge of the film gate at about the girl's collar. Immediately upon termination of the scan of frame N+1 by facet 22a, a scan of frame N by facet 22b commences at a location in frame N corresponding to the location in frame N+1 where the previous scan was interrupted. This transition from a location in one frame to a corresponding location in an adjacent frame is called an "optical splice" and is indicated by a vertical dashed line in FIG. 2. The apparatus continues scanning in this manner producing 60 full field scans every second, with an optical splice occurring whenever the scan of a frame is interrupted by the top edge of the film gate. It should be noted that the facets of polygon 20 are arranged so that the successive images of the film gate are displaced relative to each other by one film frame in the direction of the length of the film. Due to this arrangement each optical splice will match corresponding locations from adjacent film frames. So long as the polygon facet rate is chosen such that the frame projection rate plus the polygon facet rate equals the required television field rate, exact frame-rate conversion will result.

As can be seen in FIG. 1, the motor 40 that drives the film via capstan 38 is controlled by a phase locked loop servo system. A sprocket wheel 44 connected to a tachometer 46 engages the film perforations to sense the film transport speed. The tachometer is designed to produce a pulse for each film frame. The signal from the tachometer is supplied as a feedback signal to a phase locked loop circuit 48. A reference signal for the phase locked loop circuit is supplied by a control electronics circuit 50. The reference signal comprises a pulse train having a frequency representing the desired projection rate. The phase locked loop servo causes the film to be transported at a frame rate determined by the reference signal.

Likewise motor 42 that drives the polygon 20 is controlled by a phase locked loop servo system. A tachometer 52 is connected to the shaft of motor 42 to produce a pulse for each polygon facet. The signal from tachometer 52 is supplied as a feedback signal to a phase locked loop circuit 54. A reference signal for the phase locked loop circuit is supplied by control electronics 50. The reference signal comprises a pulse train having a frequency representing the desired rotation rate in facets per second for polygon 20.

The reference signals for the phase locked loop circuit are generated by control electronics 50. Control electronics 50 receives the horizontal (H) and vertical (V) sync signals generated by clock generator 34 and produces the reference signals by dividing either the horizontal or the vertical sync signal, using digital electronic circuits 56 in a known manner. The various divisors employed are indicated on the divider circuits 56. The frequency of the horizontal sync signal for standard black-and-white television is 15,750 Hz and the frequency of the vertical sync signal is 60 Hz.

For example, an 18 pulse per second reference signal is required for projecting the film at 18 frames per second. The signal may be obtained from the horizontal sync signal (H) by dividing by 875. The corresponding polygon facet rate is 42 facets per second, since 18 plus 42 equals 60. The required polygon facet rate reference signal may be obtained by dividing the horizontal sync signal (H) by 375. Other speed combinations can be obtained in a similar manner. If the film scanner is employed to scan slide transparencies, the film frame rate would be equivalent to a zero frame rate. The control electronics 50 is shown as having 5 selectable speeds. A two layer, five position gang switch 56 selectively connects the outputs of the dividers to the phase locked loop circuits to achieve the following selectable speeds:

| Switch Position | Film Frames/Sec | Polygon Facets/Sec |
| --- | --- | --- |
| 1 | 25 | 35 |
| 2 | 18 | 42 |
| 3 | 7.5 | 52.5 |
| 4 | 3.75 | 56.25 |
| 5 | 0 | 60 |

The optical system of the film scanner was designed for Super-8 film having a frame height of 4.2342 mm. The system was designed to be optimized for a film projection rate of 18 frames per second and a corresponding polygon rotation rate of 42 facets per second resulting in a 60 field per second television signal. The line sensing array scans a line that is 1/262.5 of the vertical frame height of the film. The system therefore scans out $(18+42) \times 262.5 = 15{,}750$ lines per second or 60 distinct 262.5 line images (TV fields) per second.

Film Gate Configuration

Figure 3:
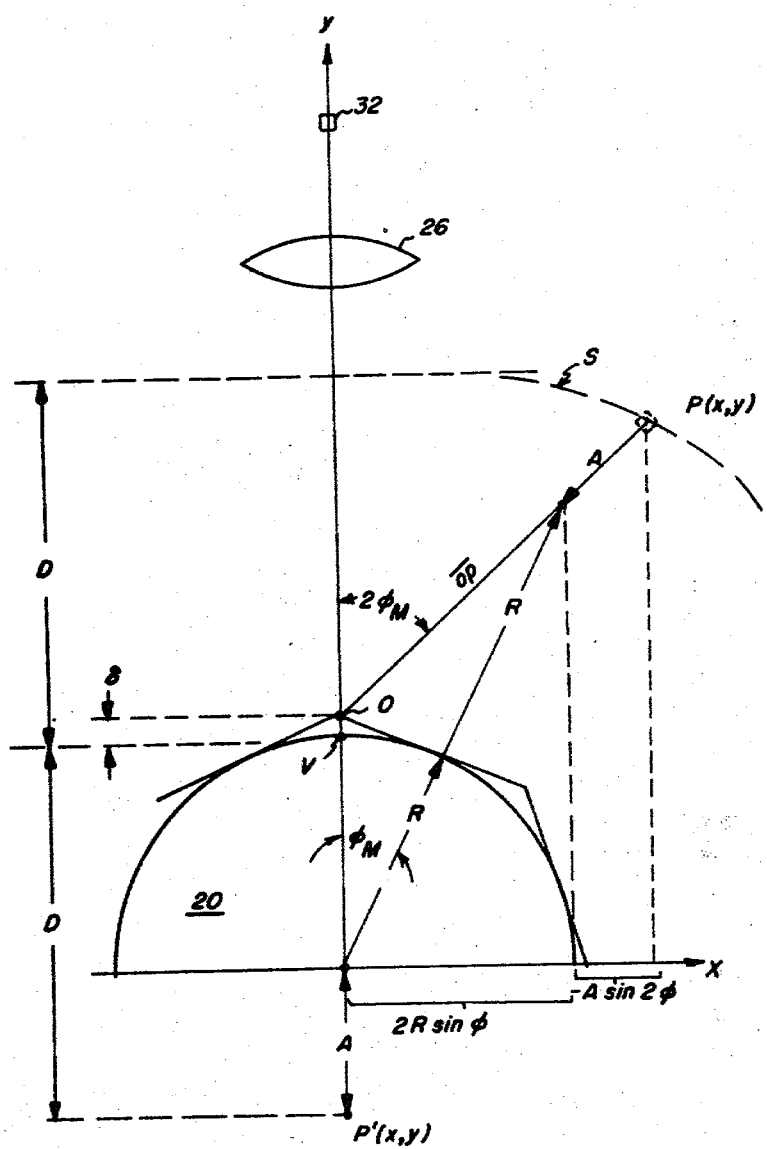
FIG. 3 is a diagram showing the unfolded optical path of the film scanning apparatus and is useful in describing the determination of the locus of the film plane in the film scanning apparatus.

The shape of a surface S defined by the imagined projected image of the line sensing array as deflected by the rotating polygon at the film plane is calculated as shown in FIG. 3. FIG. 3 is a diagram showing the "unfolded" optical configuration of the polygon scanner of FIG. 1 (i.e. the beam splitter 18 has been removed). The scan lens 26 forms a virtual image of the line sensing array 32 along a line (perpendicular to the plane of the diagram) through the point P' (x,y) located a distance D behind the polygon vertex V (V is at the intersection of the scan lens optical axis and the circle of radius R inscribed within the polygon 20). A real image of the line sensing array is formed along a line through point P (x,y) via reflection from the active polygon facet. From the geometry of the diagram it is seen that the coordinates of P are $$x_p = 2R \sin \phi - A \sin 2\phi \quad (1)$$

$$y_p = 2R \cos \phi - A \cos 2\phi \quad (2)$$

where $\phi$ is the polygon rotation angle and $A = R - D$. Thus, the locus of image points P (the dashed arc in FIG. 3) is on a cylindrical surface only when $A = 0$ (i.e. when P' is on the polygon axis of rotation). When the radius R of the inscribed circle of the polygon is equal to the distance D along the optical axis of the polygon to the film, the surface defined by the film gate will be a portion of a circular cylinder of radius 2R centered about the axis of rotation of the polygon.

Figure 4:
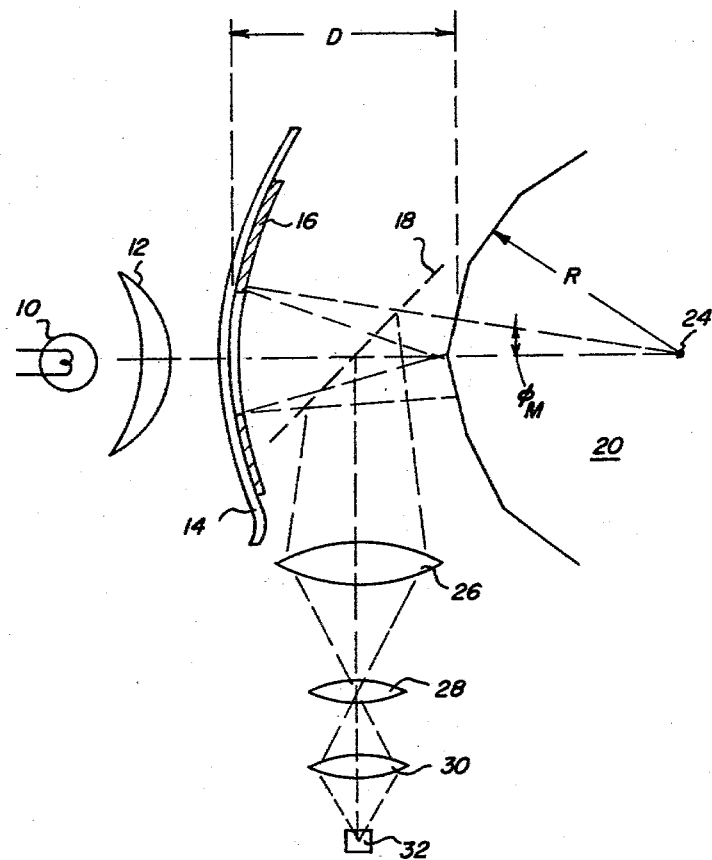
FIG. 4 is a schematic diagram showing an optical configuration according to the invention wherein the film gate defines a portion of a cylindrical surface.

As mentioned earlier, the scan surface S is not generally a simple cylindrical surface of radius D centered at the polygon vertex V. This is due to the fact that the reflected image-forming principle ray $\overline{OP}$ is lifted above V by a distance $$\delta = \frac{(1 - \cos \phi)}{\cos \phi} R \quad (3)$$

and is also lengthened by $\delta$ as the polygon rotates. It is this "polygon lift" that causes the scan surface S to generally have a cross-section resembling a recurved bow. The surface S is a portion of a cylinder of radius 2R only when $D = R$. FIG. 4 is a partial schematic diagram of the optical system of the scanning apparatus wherein $D = R$ and film gate 16 defines a portion of a circular cylinder of radius 2R centered about the axis of rotation 24 of the polygon.

Alternatively, it is possible to configure the optical system so that the scan surface S is a substantially flat plane that is perpendicular to the Y axis in FIG. 3. Setting $y_p$ when $(\phi = 0)$ equal to $y_p$ when $(\phi = \phi_M)$ from equation (2) we find $$2R - A = 2R \cos \phi_M - A \cos 2\phi_M \quad (4)$$

Substituting $-A = D - R$ in equation (4) and rearranging yields $$\frac{R}{D} = \frac{1 + \cos \phi_M}{\cos \phi_M} \quad (5)$$

Figure 5:
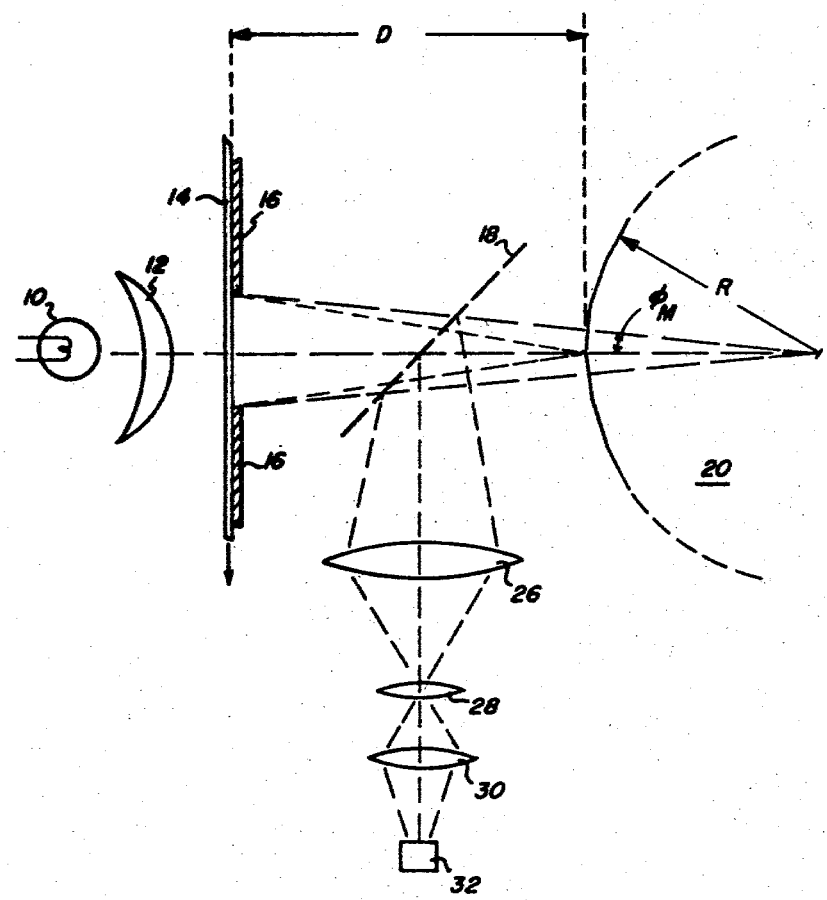
FIG. 5 is a schematic diagram showing an optical configuration according to the invention wherein the film gate defines a plane surface.

If R/D has a value given by equation (5), the imaged scan lines through point $P(\phi=0)$ and $P(\phi=\phi_M)$ will lie in a plane perpendicular to the y axis in FIG. 3. FIG. 5 is a partial schematic diagram of the optical system of the scanning apparatus wherein $$\frac{R}{D} = \frac{1 + \cos \phi_M}{\cos \phi_M}$$

and the film gate 16 defines a substantially flat plane. The scan length in this plane can be obtained by substituting equation (5) into equation (1) and solving for x.

As an example, assume a 40 facet polygon is employed to scan a single frame of Super-8 film as the polygon rotates from $-\phi_M$ to $+\phi_M$, and further, assume the scanned Super-8 frame lies in a plane perpendicular to the y axis in FIG. 3. Since there are 40 facets in the polygon, $\phi_M = 4.5°$, and since the scanned surface is to be a substantially flat plane, the value for R/D is given by equation (5).

$$\frac{R}{D} = \frac{1 + \cos 4.5°}{\cos 4.5°} = 2.0031 \quad (6)$$

The polygon size is determined by the required scan length, i.e. by the distance between points $P(\phi = 0)$ and $P(\phi = \phi_M)$. The vertical height of a Super-8 frame is 4.2342 mm. Thus, $h/2 = x = 2.1171$ mm. in equation (1). Substituting $\phi = \phi_M = 4.5°$ in equation (1) we find $R = 26.9418$ mm and from equation (6) that $D = 13.4501$ mm.

Figure 6:
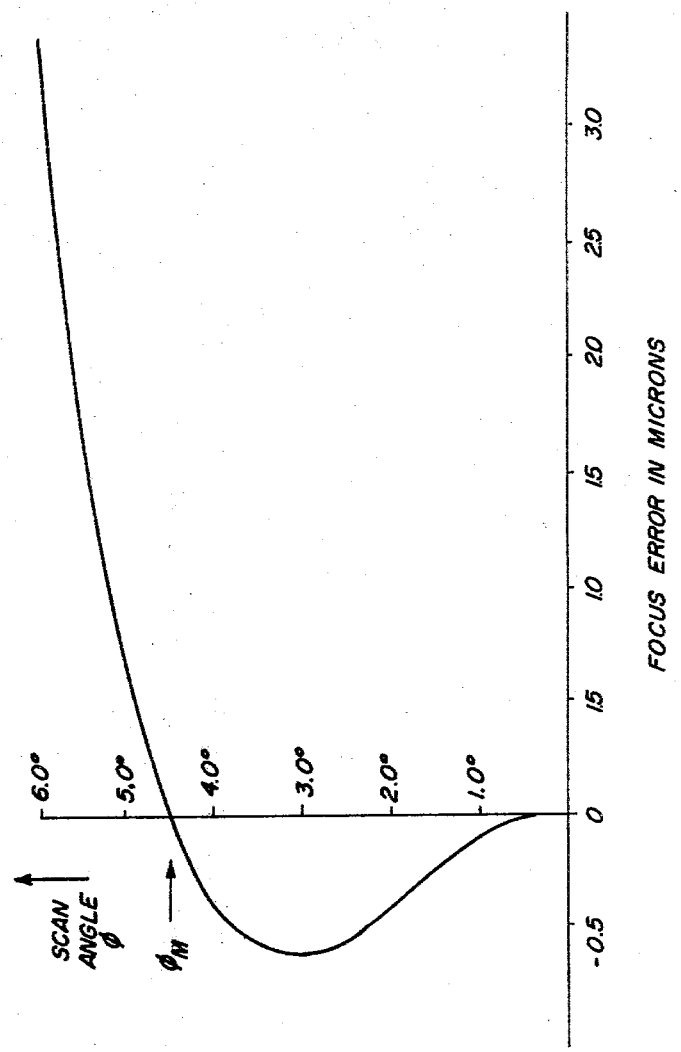
FIG. 6 is a plot showing the focus error versus scan angle in a preferred embodiment of the plane surface film gate optical configuration shown in FIG. 5.
Figure 7:
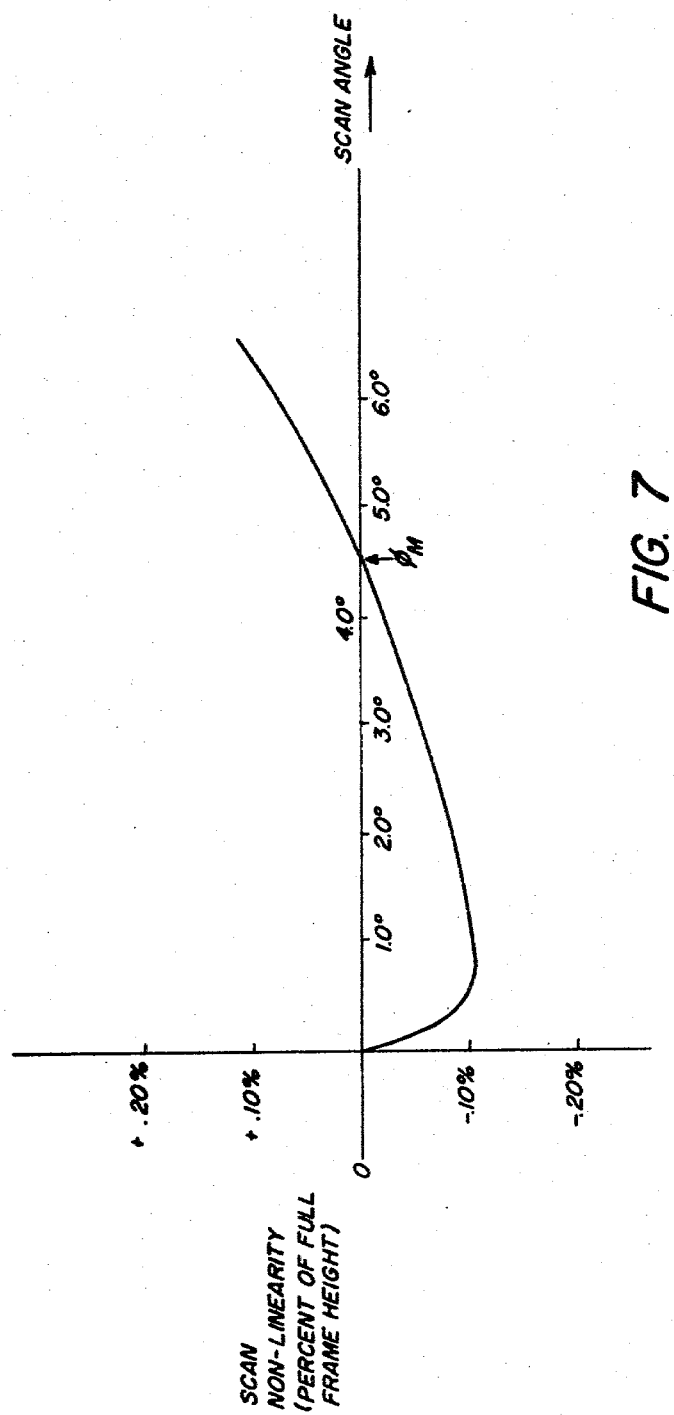
FIG. 7 is a plot showing scan distortion versus scan angle in a preferred embodiment of the plane surface film gate optical configuration shown in FIG. 5.

FIGS. 6 and 7 show the extremely accurate focus maintenance and low distortion, respectively, resulting from the film scanner configured as described above.

A 40 facet polygon was chosen because the practical manufacturing tolerance on facet-to-facet angular error is about 30 arc seconds. Since 525 lines of resolution are required for a standard television signal, 30 arc seconds times 525 is approximately equal to 4.5°, where 4.5° is equal to $\phi_M$ for a 40 facet polygon. This guarantees that the maximum scan error due to polygon facet angle errors over the total scan range of $2\phi_M$ will be 1/1050 of the scanned frame or ½ TV line.

Scan Lens Requirements

Figure 8:
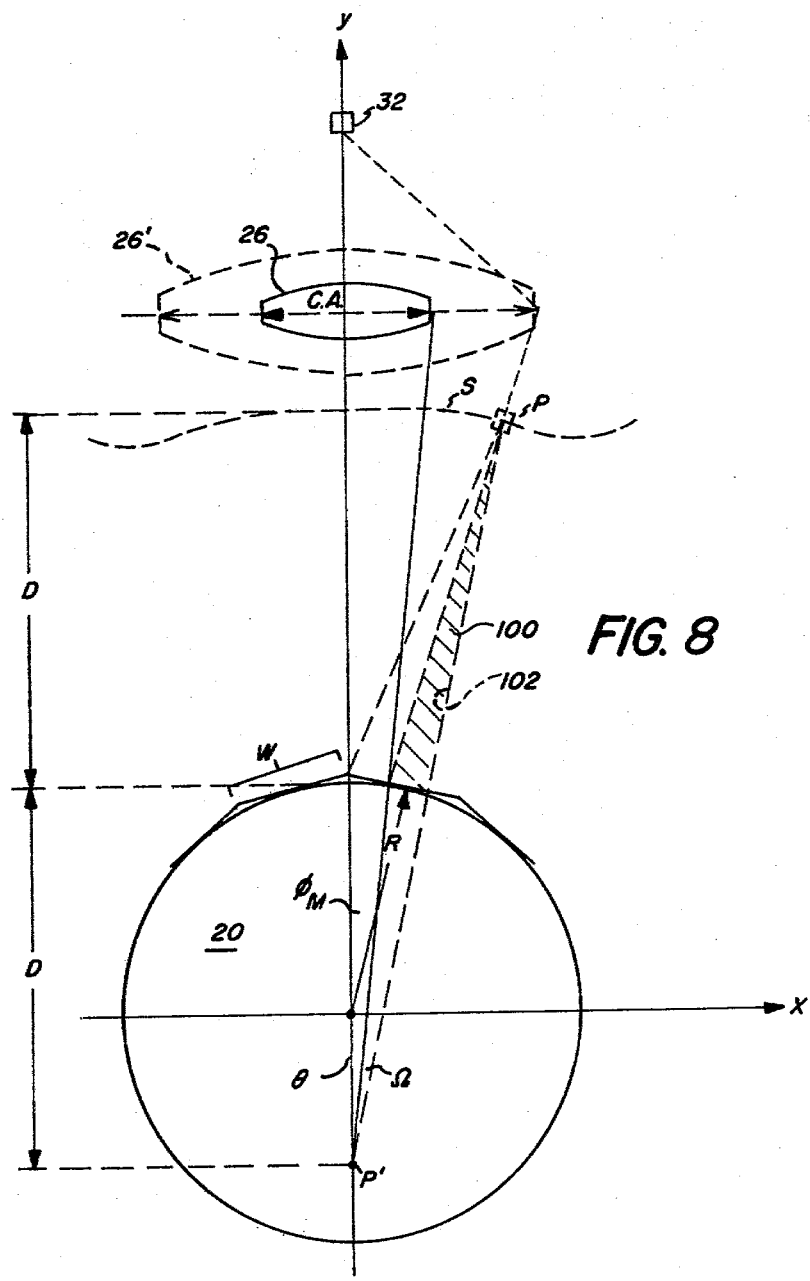
FIG. 8 is a schematic diagram of the unfolded optical path of the film scanning apparatus and is useful in describing the required clear aperture of the scanning lens according to one feature of the present invention.

FIG. 8 shows that in order to eliminate vignetting of the imaging light over the entire range of polygon scan angles $(-\phi_M \leq \phi \leq \phi_M)$, the active polygon facet must be the aperture stop of the imaging system. Therefore, the required scan lens clear aperture (C.A.) will depend upon: (i) the number of polygon facets (i.e. the value of $\phi_M$) and (ii) the distance from the virtual image point P' to the scan lens. If the scan lens clear aperture is too small, as shown by lens 26 in FIG. 8, a bundle of light rays 100 will be vignetted. If the C.A. is sufficiently large, as shown by scan lens 26' (shown in phantom), none of the light rays reflected from the polygon mirror surface will be vignetted. $\theta$, the half angle of the cone of imaging light rays from P' collected by the active polygon facet of width $W = 2R \tan \phi_M$ is given by $$\tan \theta = \frac{W}{2D} = \frac{R}{D} \tan \phi_M \quad (7)$$

-continued where $$\phi_M = \frac{360°}{2N} \; ; \; N = \text{the number of polygon facets.} \quad (8)$$

When the polygon is at its maximum scan angle $\phi_M$, the marginal imaging light ray 102 collected by the active polygon facet will be at an an angle $\Omega$ relative to the scan lens optical axis. $\Omega$ is given by $$\tan \Omega = \frac{R \sin 2\phi_M}{R \cos 2\phi_M - (R - D)} \quad (9)$$

Thus, when $R=D$ (cylindrical surface film gate) we have $$\Omega = 2\phi_M \quad (10)$$

and $$\theta = \phi_M \quad (11)$$

When $\frac{R}{D} = \frac{1 + \cos \phi_M}{\cos \phi_M}$ (planar film gate) $\quad (11)$ equation (9) becomes $$\tan \Omega = \frac{\sin 2\phi_M}{\cos 2\phi_M - \frac{1}{1 + \cos \phi_M}} \quad (12)$$

and from equations (7) and (5)

$$\tan \theta = \frac{\tan \phi_M (1 + \cos \phi_M)}{\cos \phi_M} \quad (13)$$

The required scan lens clear aperture, C.A., is therefore $$C.A. = 2(f+z) \tan \Omega \quad (14)$$

where f is the scan lens focal lens and (f+z) is the distance from the virtual image point P' to the scan lens. The required scan lens f/no. is given by $$f/no. = \frac{f}{C.A.} = \frac{f}{2(f+z)\tan \Omega} = \frac{f}{2f(1 + \frac{z}{f})\tan \Omega} = \left(\frac{m}{1+m}\right) \frac{1}{2 \tan \Omega} \quad (15)$$

where $m=f/z$ is the magnification at which the scan lens images a line of the scanned surface (i.e. the film gates) onto the sensor. If $m=1$ the scan lens f/no. is $$(f/no.)_{m=1} = \frac{1}{4 \tan \Omega} \quad (16)$$

The choice of scan lens focal length is important. This focal length must be long enough so that the distance f+z from the virtual image point P' to the scan lens is large enough to allow the beam splitter 18 to be positioned between the film gate 16 and the polygon 20 (see FIG. 1) when the scan lens is working at the required magnification.

Often, the desired scan lens magnification will be such that an impractical scan lens f/no. will be required. For example, the solid-state line sensing array employed in the preferred embodiment of the apparatus is a FAIRCHILD Semiconductor CCD-110 having 256 elements in a linear array 0.131 inches long. In order to image an entire 0.224 inch long Super-8 horizontal line on this device, the scan lens must work at a magnification of $$m = \frac{0.131 \text{ inches}}{0.224 \text{ inches}} = .585 \quad (17)$$

From equations (10) and (15) we find that the required scan lens f/no. is 1.165, which is a very fast lens. This situation is alleviated by allowing the scan lens to work at a magnification of $m=2$ (so that the required f/no. is only 2.10) and reimaging the magnified image of the Super-8 line formed by the scan lens onto the solid-state line sensor with a second lens (the objective lens 18 in FIG. 1) working at a magnification of $$m_d = 0.585/2.0 = 0.293 \quad (18)$$

A field lens that images the exit pupil of the scan lens onto the entrance pupil of the objective lens is placed after the scan lens to prevent further vignetting of the final image forming light by the objective lens. The lenses employed in the scanner shown in FIG. 1 are a 40 mm. focal length f/1.9 scan lens (a Hastings triplet), a 25 mm. focal length f/2.0 objective lens (another Hastings triplet) and a 53 mm. focal length f/2.8 field lens (a simple biconvex crown singlet). Note, that the objective and field lenses would not be required if a line sensor having a length equal to 0.224" were used.

Alternative Optical Configuration

Figure 9:
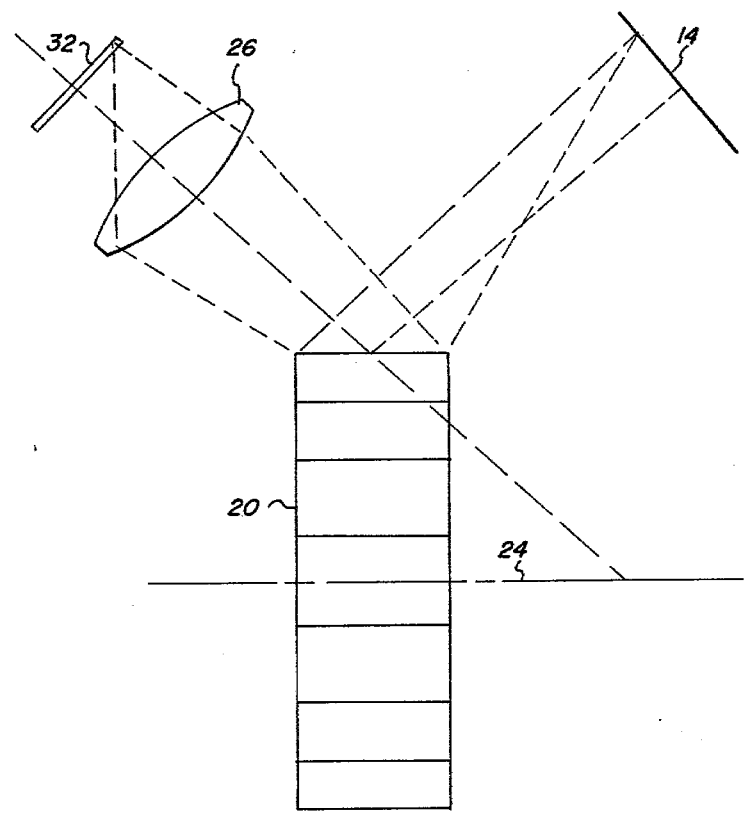
FIG. 9 is a schematic diagram showing an alternative optical configuration according to the present invention.

FIG. 9 is a partial schematic diagram showing an alternative optical configuration for the film scanner obviating the need for a beam splitter. As in the previous embodiment, the optical axis of the scan lens and the axis of rotation 24 of the polygon still lie in a common plane, however, in this embodiment, the optical axis of the scan lens is not perpendicular to the axis of rotation of the polygon, whereby, the scan lens and sensor are placed to one side of the polygon and the film gate is placed to the other side of the polygon such that the optical axis is no longer folded back on itself during scanning. This convenience is purchased at the price of slightly increased optical distortion at the film gate.

The invention has been described in detail with particular reference to preferred embodiments thereof, but it will be understood that variations and modifications can be effected within the spirit and scope of the invention.

I claim:

1. Apparatus for scanning film to produce a television signal, comprising:
   means including a light source and a scan lens for projecting an image of a portion of the film;
   solid-state line sensing means for scanning the image of the film in a direction generally perpendicular to the length of the film at a standard television line rate to produce a television signal;
   a multifacet mirror having a plurality of reflecting facets arranged around a central axis, the facets being tangent to a circle of radius R, the polygon being located in the optical path between the scan lens and the film in a position such that the optical axis of the scan lens between the scan lens and the mirror and the axis of the mirror lie in the same plane;

means for rotating the mirror about said axis to cause successive facets to deflect the optical axis between the scan lens and the film gate to sweep an image of film past the line sensing means in a direction generally parallel to the length of the film, at a standard television field rate;

film gate means forming an aperture for defining the projected portion of the film and for constraining the film to coincide with the surface defined by an image of the line sensing means formed by the scan lens and deflected by the mirror, the film gate being located with respect to the mirror such that the center of the film gate lies in said plane.

2. The invention claimed in claim 1 wherein the clear aperture of the scan lens is sufficiently large so that the mirror facets define the limiting aperture of the optical system.

3. The invention claimed in claim 1 wherein the mirror is arranged with respect to the scan lens such that the optical axis of the scan lens between the scan lens and the polygon is perpendicular to the axis of rotation of the mirror; and further comprising beam splitter means disposed in the optical path between the scan lens and the mirror for deflecting the optical axis, whereby the scan lens and the line sensing means may be positioned out of interference with the optical path between the mirror and the film gate.

4. The invention claimed in claim 1 wherein the distance D along the optical axis from a facet of the mirror to the film is equal to R, whereby the surface defined by the film gate will be a portion of a circular cylinder of radius 2R centered about the axis of the mirror.

5. The invention claimed in claim 1 wherein the ratio R/D, where D is the distance along the optical axis from a facet of the mirror to the film when the deflected portion of the optical axis lies in said plane, is equal to the ratio $$\frac{1 + \cos \phi_M}{\cos \phi_M}$$

where $\phi_M$ is the angle that the deflected portion of the optical axis makes with said plane when the scan is at the top or bottom of the film gate, whereby the surface defined by the film gate will be substantially a flat plane.

6. The invention claimed in claim 1 wherein the mirror is arranged with respect to the scan lens such that the optical axis of the scan lens between the scan lens and the mirror makes an angle other than 90° with the axis of the mirror, said angle deviating from 90° sufficiently so that the line sensing means does not interfere with the optical path between the film gate and the mirror.

* * * * *